A. COOLEY.
Whiffletree.

No. 17,668. Patented June 30, 1857.

UNITED STATES PATENT OFFICE.

ANTHONY COOLEY, OF PAW PAW, MICHIGAN.

WHIFFLETREE-HOOK.

Specification of Letters Patent No. 17,668, dated June 30, 1857.

*To all whom it may concern:*

Be it known that I, ANTHONY COOLEY, of the village of Paw Paw, in the county of Van Buren and State of Michigan, have invented a new and useful Improvement in Whiffletree-Hooks; and I do hereby declare that the following is a full, clear, and exact description of the same, reference being had to the accompanying drawings, forming part of this specification, in which—

Figure 1:
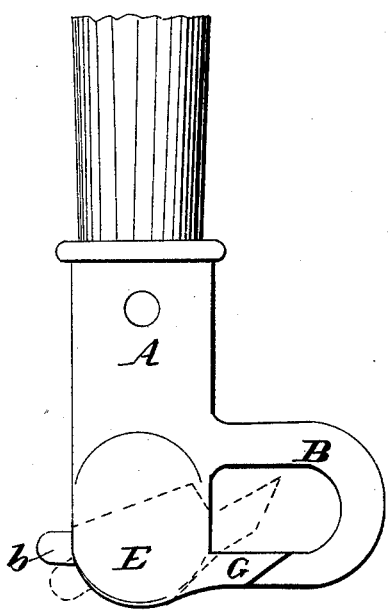
Figure 2:
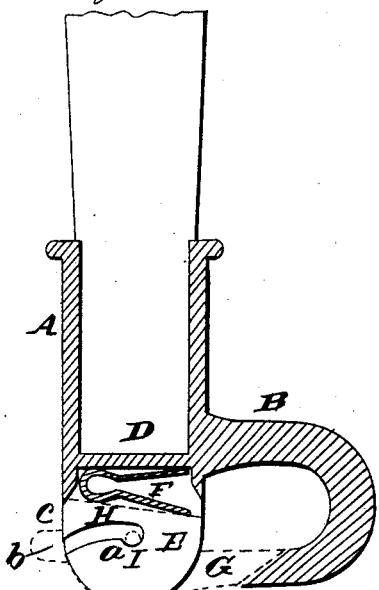
Figure 4:
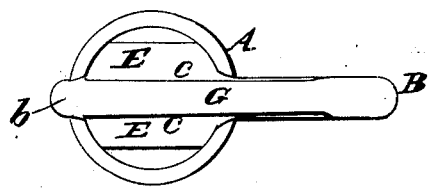
Figure 3:
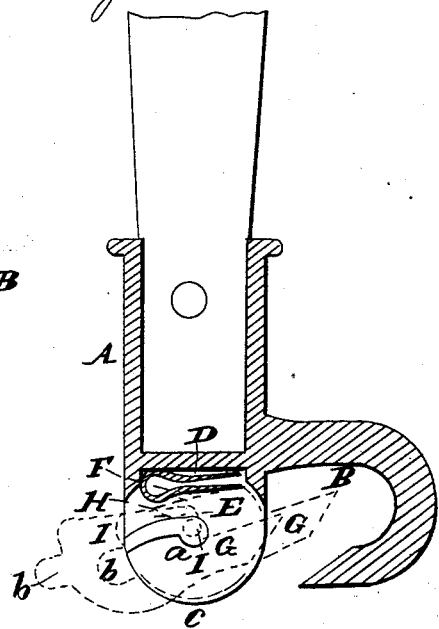

Figure 1, is an outside view of a whiffletree hook constructed with my improvements. Fig. 2, is a longitudinal section of the same, with the snap shown in dotted lines. Fig. 3, is a similar section, with the snap shown by red and blue lines in two positions. Fig. 4 is an end view of the hook as in Fig. 1.

Similar letters of reference in each of the several figures indicate corresponding parts.

The nature of my invention consists in providing the outer extremity of the hook socket with an open slot, and spring seat, and fitting the feather spring which keeps the hook closed, and the shank of the snap, or moving part of the hook, in the same, in the manner hereinafter specified; whereby said spring is entirely hid from view, and protected from all external influences, and the snap, or moving part of the hook, when fitted to the socket, is made to appear as part of the same, and as necessary to give it a complete appearance; instead of, as usual, having the spring exposed to the wet and mud, and the snap arranged so as to appear as an additional attachment to the end of the socket, and thus increase expense and give the whiffletree a clumsy and unsymmetrical appearance, as well as afford great facilities for the accumulation of mud about the hook and spring.

My invention consists, 2nd, in furnishing, internally, each of the cheek pieces of the open slot of the hook socket, with a scroll shaped slot, and the snap with two short journals, and fitting these journals in said slots and holding them in place by means of the feather spring, which keeps the snap closed, as presently set forth. Whereby the necessity of using a loose or separate fulcrum pin for connecting the snap with the stationary part of the hook is avoided and great facilities for connecting and disconnecting it afforded.

To enable others skilled in the art to make and use my invention I will proceed to describe its construction and operation.

A, is the socket and B, the hook both cast in one piece.

C, is the open slot, and D, the seat for the spring, cast in the outer extremity of the socket.

E, E, are the cheek pieces of the socket.

F, is the feather spring fitted in the seat D, of the socket and G, is the snap or moving part of the hook, its shank is fitted in the slot between the cheek pieces, and the inner straight edge of the same comes in close contact with the spring F, as illustrated by dotted lines in Fig. 2.

H, H, Figs. 2, and 3, are the scroll shaped slots cast in the inner face of the cheek pieces, and I, the short journals cast on the shank of the snap and turning freely in the cylindrical part of the slots, being confined in place by the feather spring, as shown. The manner in which the journals are got down into the cylindrical part of the slots is as follows. The snap is brought to the position shown in red in Fig. 3, and its journals consequently placed in line with the slots. The snap is now forced to the position shown in blue in same figure and when let free is caused to assume a position behind the shoulders $a$, of the grooves and is held in that condition by the spring. To remove the snap, it must be forced to the position shown in blue and then drawn out to, and beyond the position shown in red. To open the hook in order to introduce the tug the snap has simply to be forced to the position shown in red lines in Fig. 1. To do which the ring or cockeye is pressed against the stop and it snaps into the hook. To unhook the tug open the hook by taking hold of the tug and twisting the cockeye half around or it may be accomplished by placing the thumb on the knob $b$, of the snap.

My whiffletree hook I consider far better and preferable to others in use on account of its extreme simplicity, neatness of appearance, cheapness of construction, and durability as well as for its perfect safety; there being no costly extra attachments, no springs exposed for mud to collect on and withal no possible chance for the tug or trace to unhook, except done by hand.

What I claim as my invention, and desire to secure by Letters Patent, is—

1. Providing the outer extremity of the hook socket A, with an open slot C, and spring seat D, and fitting the feather spring F, and the shank of the snap G, in the same, substantially as and for the purposes set forth.

2. I claim furnishing internally each of the cheek pieces of the open slot C, of the hook socket A, with a scroll slot H, and the snap G, with two short journals I, and fitting these journals in said slots and holding them in place by means of the feather spring F, substantially as and for the purpose herein set forth.

ANTHONY COOLEY.

Witnesses:
EDM. F. BROWN,
ROBT. W. FENWICK.